US008200839B1

(12) United States Patent
Aysan et al.

(10) Patent No.: US 8,200,839 B1
(45) Date of Patent: Jun. 12, 2012

(54) METHOD AND APPARATUS FOR RESTORING SERVICE LABEL INFORMATION

(75) Inventors: Can Aysan, Kanata (CA); Matthew Yuen, Ottawa (CA)

(73) Assignee: Rockstar Bidco LP, New York, NY (US)

( * ) Notice: Subject to any disclaimer, the term of this patent is extended or adjusted under 35 U.S.C. 154(b) by 1219 days.

(21) Appl. No.: 10/889,647

(22) Filed: Jul. 12, 2004

Related U.S. Application Data

(60) Provisional application No. 60/566,712, filed on Apr. 30, 2004.

(51) Int. Cl.
G06F 15/173 (2006.01)
G06F 15/16 (2006.01)
H04L 12/66 (2006.01)
H04L 12/56 (2006.01)

(52) U.S. Cl. .... 709/238; 709/249; 370/352; 370/395.63

(58) Field of Classification Search ................ 709/238, 709/226, 249
See application file for complete search history.

(56) References Cited

U.S. PATENT DOCUMENTS

| 6,205,488 | B1 * | 3/2001 | Casey et al. .................... 709/238 |
| 6,408,001 | B1 * | 6/2002 | Chuah et al. .................... 370/392 |
| 6,466,985 | B1 * | 10/2002 | Goyal et al. .................... 709/238 |
| 6,526,056 | B1 | 2/2003 | Rekhter et al. |
| 6,771,662 | B1 * | 8/2004 | Miki et al. .................... 370/469 |
| 6,882,643 | B1 * | 4/2005 | Mauger et al. ................ 370/389 |
| 6,959,335 | B1 | 10/2005 | Hayball et al. |
| 7,116,665 | B2 * | 10/2006 | Balay et al. .................... 370/392 |
| 7,283,477 | B1 | 10/2007 | Fedyk et al. |
| 7,336,615 | B1 * | 2/2008 | Pan et al. ...................... 370/248 |
| 7,359,404 | B1 * | 4/2008 | Allan ............................. 370/469 |
| 2002/0037010 | A1 * | 3/2002 | Yamauchi ................ 370/395.53 |
| 2002/0089715 | A1 | 7/2002 | Mesh et al. |
| 2002/0103924 | A1 * | 8/2002 | Nomura ........................ 709/235 |
| 2003/0112749 | A1 * | 6/2003 | Hassink et al. ................. 370/225 |
| 2003/0189898 | A1 * | 10/2003 | Frick et al. .................... 370/227 |
| 2004/0047353 | A1 | 3/2004 | Umayabashi et al. |
| 2005/0097357 | A1 | 5/2005 | Smith |
| 2005/0220143 | A1 | 10/2005 | Del Regno et al. |
| 2006/0168279 | A1 * | 7/2006 | Lee et al. ...................... 709/230 |

OTHER PUBLICATIONS

E. Rosen, et al., *BGP/MPLS/VPNs*, Internet Engineering Task Force (IETF) Request for Comments (RFC) 2547, Mar. 1999 (24 pages).
E. Rosen, et al., *BGP/MPLS IP VPNs*, IETF Internet Draft, draft-ietf-l3vpn-rfc2547bis-01.txt, Sep. 2003 (45 pages).

* cited by examiner

*Primary Examiner* — Yasin Barqadle
*Assistant Examiner* — Joe Chacko
(74) *Attorney, Agent, or Firm* — Anderson Gorecki & Manaras LLP

(57) ABSTRACT

Multiple service label types may be used in a given network element to optimize scalability of the data plane, minimize overhead associated with service label management, and allow new services to be offered. Service label management may be done in a dynamic manner so that service labels may be selected for routes in a dynamic fashion as the network changes. VPNs handled by the network element may have different types of service labels, and different routes within a particular VPN may be allocated different service label types. Service label requests may be stored on the data plane to allow a service label request database to be restored from the data plane upon a control plane failure, so that new service labels are not required to be allocated after a control plane failure.

14 Claims, 5 Drawing Sheets

METHOD AND APPARATUS FOR RESTORING SERVICE LABEL INFORMATION

BACKGROUND OF THE INVENTION

1. Field of the Invention

The present invention relates to communication networks and, more particularly, to a method and apparatus for restoring service label information.

2. Description of the Related Art

Data communication networks may include various computers, servers, nodes, routers, switches, bridges, hubs, proxies, and other network devices coupled together and configured to pass data to one another. These devices will be referred to herein as "network elements." Data is communicated through the data communication network by passing protocol data units, such as data frames, packets, cells, or segments, between the network elements by utilizing one or more communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how packets should be handled or routed through the network by the network elements, and how information associated with routing information should be exchanged between the network elements.

A Virtual Private Network (VPN) may be formed by securing communications between two or more networks or network elements to form a VPN tunnel, such as by encrypting or encapsulating transmissions between the networks or network elements. Using VPN tunnels enables information to be exchanged securely between geographically dispersed sites without obtaining dedicated resources through the network.

To enable devices on one VPN site to communicate with devices on another VPN site via the VPN tunnel, it is necessary to exchange routing information between the two VPN sites. Likewise, as network elements are added and removed from the networks, or as problems are encountered and fixed in the networks, the routing tables need to be updated and advertised to the other participating sites in the VPN. Whenever a route is advertised, a service label is attached to the route, as discussed in greater detail below.

There are several commonly utilized methods of establishing VPN tunnels on a network. For example, VPNs may be established by customers through the deployment of network elements configured with VPN software. These VPNs will be referred to herein as Customer Premise Equipment-based (CPE-based) VPNs. Another way of establishing VPNs is to configure the VPN at the Provider Edge (PE) network elements to allow the service provider to provision VPN services on behalf of the customer. One common way to do this is described in Internet Engineering Task Force (IETF) Request For Comments (RFC) 2547, the content of which is hereby incorporated herein by reference. RFC 2547 describes a VPN architecture in which MultiProtocol Label Switching (MPLS)-based tunnels are used to forward packets over the network backbone. A protocol referred to as Border Gateway Protocol (BGP) is used to distribute routes over the backbone for VPNs provisioned through a particular PE network element. Routing information for these Provider-Provisioned VPNS is stored in a VPN routing and forwarding table (VRF) or a distinguishable area of the PE's common VRF. VPNs established utilizing the 2547 VPN model will be referred to herein as "VRF-based VPNs."

VRF-based VPNs may be designed to have having many different access topologies. One popular topology is commonly referred to as a "Hub and Spoke" topology, although other topologies such as a full mesh topology may be used as well. In a hub and spoke topology, the hub controls communications on the VPN such that all spokes can talk to the hub. In a "strict" hub and spoke topology, the spokes are only allowed to talk to the hub. In a "loose" hub and spoke topology, spokes are allowed to talk to each other as well, but may only do so through the hub. This allows the hub to control communication between the spokes. In a mesh topology, the sites all are allowed to talk to each other.

FIG. 1 illustrates an example of a VPN topology formed using VRF-based VPNs. As shown in FIG. 1, the VPN service provider provides interconnectivity amongst Customer Edge (CE) network elements 10. A CE device 10 is a device which resides in a VPN site 12 and connects to a Provider Edge node 14. Essentially, a CE device allows the VPN site access to one or more remote VPN sites which belong to the same VPN. A Provider Edge (PE) node is a router which attaches to one or more CE devices and peers using Interior BGP (IBGP) with at least one other PE node. The PE node allows remote access to other VPNs which are locally supported by this PE. When handling Internet Protocol (IP) traffic, a PE node acts as a Label Edge Router which terminates Label Switched Path (LSP) tunnels used to forward traffic to other PE nodes. PE nodes may be directly connected to other PE nodes, or may be connected through other network elements such as backbone routers 16. Backbone routers are commonly designated in the industry by the letter P. The provider "P" router is a backbone router which provides interior gateway protocol connectivity between PE nodes. P routers are generally not connected to CE devices and thus have no need for knowledge of VPN routing information. It may be possible for a given router to act as a PE node for some VPNs and as a P router for other VPNs.

In a VRF-based VPN context, the PE routes form the tunnel end points for the VPN tunnels and have information associated with the configuration of the VPNs on the network. The P routers, by contrast, are configured to forward traffic and have no information about the VPNs configured through them. In an MPLS network 18, this is accomplished by MPLS label switching along label switched paths through the network. Service labels are thus unrelated to MPLS labels, as MPLS labels are used to switch the traffic on the network whereas the service labels are used by the tunnel end points to specify how the tunnel traffic should be handled at the tunnel end point.

In a VRF-based VPN architecture, each VPN configured through a network element will be associated with a particular VPN routing and forwarding table (VRF). Since routes within the VRF may have non-unique IP addresses, it is not possible to designate routes globally using their IP address alone. Accordingly, it has become common to associate one or more service labels with VPNs provisioned through a particular network element.

Service labels are 20 bit identifiers that are assigned by the network element maintaining the VRF and are advertised on the network along with the route information. When a PE on the opposite end of the tunnel wants to communicate a packet of information through the VPN tunnel, it addresses it to the IP address, attaches the service label that was provided by the network element, and sends the packet out onto the MPLS network using the next hop attribute associated with the route through the network. When the terminating PE network element receives the packet, it uses the service label to identify the VRF to which the packet belongs, and uses the IP address associated with the packet to index into the VRF associated with that VPN to determine how it should handle the packet. Alternatively, the network element may forward the packet based on the service label lookup alone.

A network element may host hundreds or thousands of VPNs at the same time. Each VPN may be associated with a single service label, or multiple service labels may be assigned to each VPN. The manner in which service labels are assigned to VPNs is commonly referred to as service label management. Service label management is an important aspect of VPN management and network element design, since the service labels are used by the dataplane to determine to which VPN (or VRF) an incoming packet belongs. An error in service label management may result in routes from one VPN inadvertently being included in the wrong VRF, which compromises the security of the VPNs.

IETF RFC 2547 describes three ways in which service labels may be used, each of which has particular advantages and disadvantages. For example, service labels may be assigned on a per-VPN basis, such that each VPN is provided with one service label. This has the advantage that there are fewer service labels to keep track of and manage, and thus is the easiest to manage from a service label management perspective. Since each service label may be associated with many routes, however, the data plane is required to do a full IP lookup for each packet received and, thus, this service label management system tends to be less scalable at the data plane. Also, for particular VPN architectures, such as a strict hub and spoke topography, performing an IP lookup and taking action on an IP address basis may present security problem, as traffic may inadvertently be leaked between spokes instead of all passing through the hub.

Another way in which service labels may be assigned is on a per route basis. Since there may be many routes, this method results in an inefficient control plane implementation. Specifically, since the number of service labels must be increased to the order of the number of routes maintained by the VRFs, a very large number of service labels must be generated and managed. Since the service label, as mentioned above, is a 20 bit number, this also limits the number of routes maintainable by the VRFs to around 1 million, which causes scalability problems in the dataplane as well.

The third way service labels may be assigned is on a per next-hop basis. Generally, a network element may be connected to anywhere between 1 and 10 or so other provider and provider edge network elements. Allocating a different service label per next hop basis enables a lower number of service labels to be generated for each VRF, while accelerating handling of packets at the control plane by allowing the dataplane to determine an indication of the next hop for the packet from the service label without requiring the dataplane to do a full IP lookup for each packet. Additionally, by eliminating the IP lookup requirement, this method is frequently preferred for particular VPN topographies, such as for strict hub and spoke VPN topologies.

Different vendors have adopted one of these service label management schemes depending on their particular view of how the service labels should be used and managed. Since each service label management scheme has its advantages and disadvantages, selecting a particular service label management scheme limits what you can do with the network element. Particularly, selection of a particular service label scheme may affect the number of service labels you are required to generate and manage, as well as the number and type of lookups that must be performed by the data plane of the network element. Both of these aspects may affect the scalability of components of the network element as well as dictate the types of services the network element is able to provide.

When a control plane of a network element fails, if the service label allocations are lost, new service labels will need to be allocated for use on the network. This causes service label churn which can disrupt traffic on the network. Additionally, since some of the new service labels to be allocated by the network element may already have been distributed by the control plane prior to the failure, these labels may already be associated with other routes and other VPNs. Accordingly, it would be desirable to maintain the service label database upon failure of the control plane to avoid assigning new service labels upon failure.

SUMMARY OF THE INVENTION

The present invention overcomes these and other drawbacks by providing a method and apparatus for restoring service label information upon a control plane failure. According to an embodiment of the invention, a service label type attribute is introduced to the service labels to enable the network element to treat packets associated with different service label types in different manners. This allows the service label management system to use more than one service label type to adapt the service label to the particular circumstances to optimize scalability of the data plane, minimize overhead associated with service label management, and provide particular services on the network element. The different service label types may be defined to enable additional information to be provided about an incoming packet associated with the service label or to enable the network element to take particular actions on packets associated with the particular service label types. This allows enhanced services to be provided while maintaining scalability in both the data and control plane.

According to another embodiment of the invention, a service label management system is provided to dynamically manage service labels associated with flows and routes on the network to assign service labels to optimize characteristics of the VPNs provisioned through the network element. By using service labels of different types, the service label management system is able to define how a particular flow is to be handled by the dataplane to enable both service label management optimization as well as dataplane optimization.

According to another embodiment of the invention, the service label management may be done in a dynamic manner so that service labels may be selected for routes in a dynamic fashion as the network changes. For example, it may initially be advantageous to allocate service labels on a per-route basis for a particular VRF while the VPN associated with that VRF has few routes, and then switch to a per-VRF basis once the VPN has acquired a larger number of routes. By allowing the service label management system to select a particular service label management scheme in an adaptive manner based on the particular circumstances associated with the VPN, and to apply different service label management schemes to different VPNs, the network element can optimize service label management for the VPNs provisioned through the network element.

According to yet another embodiment of the invention, the service label management system may allocate service labels in a secure manner such that transferring from one service label management system to another does not cause traffic from one VPN to leak into another VPN space. Particularly, according to an embodiment of the invention, previously used service labels are maintained obsolete for a particular period of time (optionally related to the time-out periods for routes to decay on the network) before being reallocated to a new route or new VPN. This enables the service labels to be reused in a secure manner without jeopardizing the security of the VPN with which they were previously associated.

According to yet another embodiment of the invention, the service label management system enables recovery of service label information after a control plane failure, by causing the original request that resulted in allocation of the service label to be stored in the data plane along with the service label. By storing the request in the data plane along with the service label, the service label and original request information may be restored to the control plane from the data plane. Generation of new requests for service labels may thus be matched against previous requests so that the same service labels may continue to be used despite a control plane failure. This minimizes service label churn on the network by allowing service labels to continue to be used despite a loss of the control plane data.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

A method and apparatus for adaptive service label management enables different types of service labels to be used depending on the particular properties of the VRF with which they are associated and the type of service to be provided on the network. A notion of service label type is introduced that allows service labels to be assigned in an adaptive manner depending to optimize scalability of the data plane, minimize overhead associated with service label management, and allow new services to be offered. Service label management may be done in a dynamic manner so that service labels may be selected for routes in a dynamic fashion as the network changes. VPNs handled by the network element may have different types of service labels, and different routes within a particular VPN may have different service label types. Service label requests may be backed up on the data plane to allow the control plane to reallocate service labels after a control plane failure. These and other aspects of the invention will be discussed in greater detail below.

Figure 2:
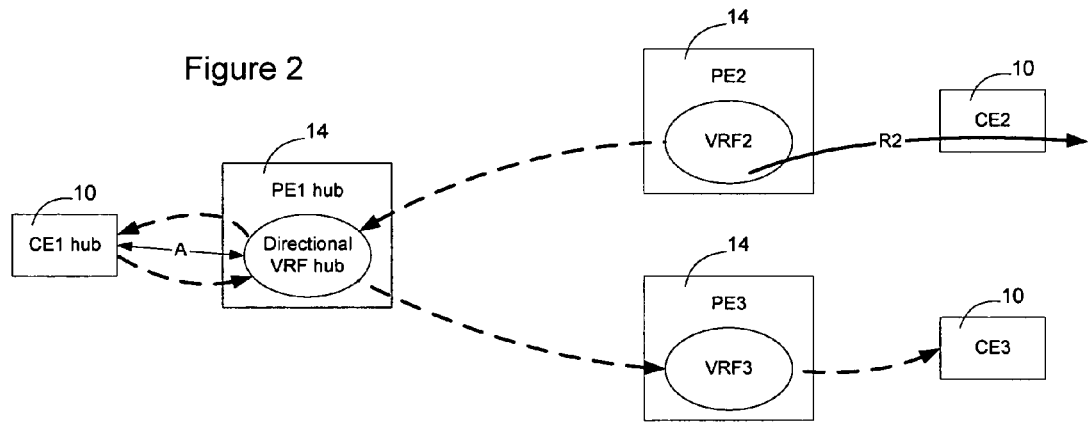
FIG. 2 is a functional block diagram illustrating the flow of routing information in the VPN network topology of FIG. 1.

FIG. 2 illustrates the flow of routing information in a VPN. As shown in FIG. 2, when a CE 10 learns a route, e.g. PE2 learns route R2, the PE 14 will advertise that route according to the route export policy of the VRF for that route. The route will be sent to all sites and imported into an appropriate VRF(s) by those sites according to the route importation policy for those VRF(s). Depending on the VPN topography, the route importation policies may differ. For example, in a mesh implementation, the route will be imported by all sites whereas in a hub and spoke implementation the route will be imported by the Hub VRF only. The PE advertising the route will associate a service label with the route R2 when it is advertised so that traffic destined for route R2 can include the PE's service label. As discussed in greater detail below, according to an embodiment of the invention, the service label may be used for many different purposes depending on the type of service label used by the PE network element for that particular route R2.

Figure 1:
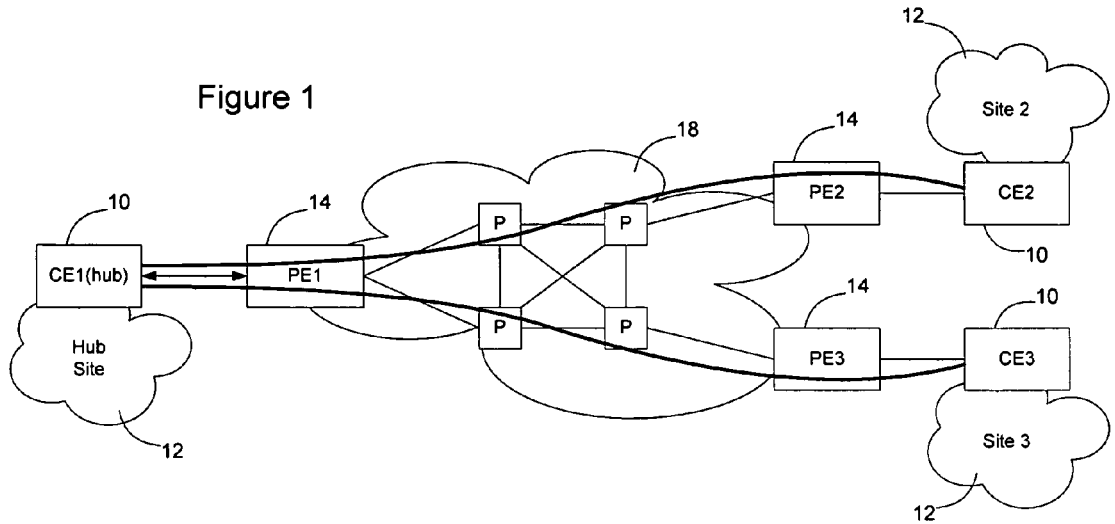
FIG. 1 is a functional block diagram of an example of a Virtual Private Network (VPN) network topology.
Figure 3:
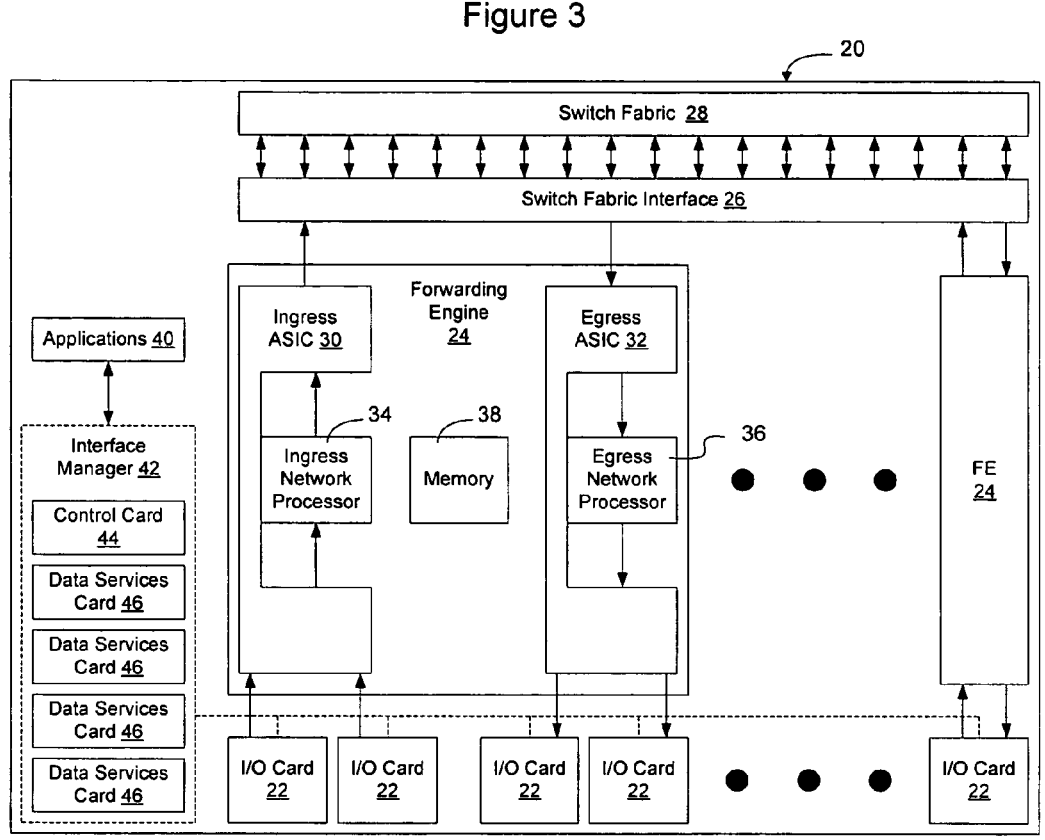
FIG. 3 is a functional block diagram of a PE network element according to an embodiment of the invention.

FIG. 3 illustrates one embodiment of a network element 20 that may be configured to implement an embodiment of the invention. The invention is not limited to a network element configured as illustrated, however, as the invention may be implemented on a network element configured in many different ways. The discussion of the specific structure and methods of operation of the embodiment illustrated in FIG. 3 is intended only to provide one example of how the invention may be used and implemented in a particular instance. The invention more broadly may be used in connection with any network element configured to handle protocol data units on a communications network. The network element of FIG. 3 may be used as an edge router 14, a router/switch 16, or another type of network element, on a communication network such as the communication network described above in connection with FIG. 1.

As shown in FIG. 3, a network element 20 generally includes Input/Output (I/O) cards 22 configured to connect to links in the communications network. The I/O cards 22 may include physical interfaces, such as optical ports, electrical ports, wireless ports, infrared ports, or ports configured to communicate with other conventional physical media, as well as configurable logical elements capable of operating as MAC (layer 2) ports under the direction of an interface manager, described in greater detail below.

One or more forwarding engines 24 are provided in the network element to process packets received over the I/O cards 22. The forwarding engines 24 forward packets to a switch fabric interface 26, which passes the packets to a switch fabric 28. The switch fabric 28 enables a packet entering on a port on one or more I/O cards 22 to be output at a different port in a conventional manner. A packet returning from the switch fabric 28 is received by one of the forwarding engines 24 and passed to one or more I/O cards 22. The packet may be handled by the same forwarding engine 24 on both the ingress and egress paths. Optionally, where more than one forwarding engine 24 is included in the network element 20, a given packet may be handled by different forwarding engines on the ingress and egress paths. The invention is not limited to any particular forwarding engine 24, switch fabric interface 26, or switch fabric 28, but rather may be implemented in any suitable network element configured to handle packets on data flows through a network. One or more Application Specific Integrated Circuits (ASICs) 30, 32 and processors 34, 36 may be provided to implement instructions and processes on the forwarding engines 24. Optionally, a memory 38 may be included to store data and instructions for use by the forwarding engines.

Applications 40 running on the network element, may require interfaces to be created across one or more ports on the I/O cards 22. Examples of applications include IP VPNs, VRF instances, Virtual Private Wire Service instances, Label Distribution Protocol instances, and numerous other types of applications. An interface manager 42 may be provided to establish an environment for support of a media abstraction layer, to enable the applications to have access to various interface types without the creation of dependencies between the applications and interfaces.

As shown in FIG. 3, the interface manager generally includes one or more control cards 44 configured to manage creation of interfaces on the network, and one or more data service cards 46 configured to implement the interfaces on the network element by interfacing with line cards 22 (also referred to herein as input/output or I/O cards), and interfacing with the forwarding engines on the network element. Other data plane architectures may be used as well, and the invention is not limited to implementation on the illustrated embodiment. For example, the data plane may be designed such that a single data service card is used to interface with all I/O cards. Alternatively, the data service cards may be integrated with the I/O cards. The invention is thus not limited to a particular architecture as it may be used in numerous differently configured network elements.

Interfaces may have many different properties. For example, a given interface may include physical encapsulation, logical channels, services per logical channel, and attributes of these services. The interface manager enables interfaces to be described in this manner, thus enabling multiple interfaces to be created to support the applications. Depending on the type of application, different service labels may need to be allocated. According to an embodiment of the invention, a service label management process is instantiated in the control plane, such as on the control card or on the data service cards, to allocate service labels to applications on the network.

Figure 4:
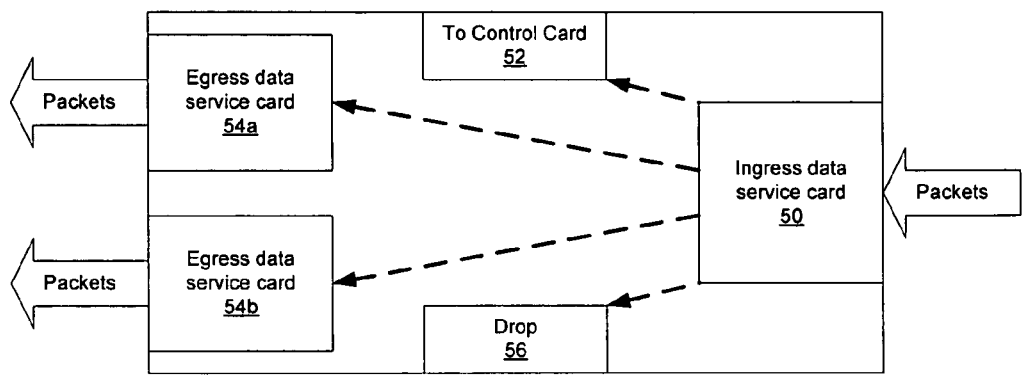
FIG. 4 is a functional block diagram illustrating the flow of data on a data plane of a Provider Edge (PE) network element, such as the PE network element of FIG. 3, according to an embodiment of the invention.

FIG. 4 illustrates a functional block diagram illustrating the flow of data on a data plane of a Provider Edge (PE) network element 14 according to an embodiment of the invention. As shown in FIG. 4, the data plane 48 of a network element includes the components of the network element that are configured to handle data traffic for established routes and paths on the network. Examples of components that may be included in the data plane include the line cards, forwarding engines, and switch fabric, although other components may be included as well. The control plane generally includes those components that serve to set up connections on the network and then program the data plane to handle the connections. An example of components that may generally be included in the control plane include the control card and data service cards, as well as a controlling network processor (not shown) configured to control operation of the network element as a whole.

As shown in FIG. 4, packets of data arrive at an ingress line card 22 under the control of an ingress data service card 50. A data service card may manage multiple line cards and the same data service card may serve as an ingress data service card for packets arriving from the core and may serve as an egress data service card for packets exiting onto the core. The ingress data service card will perform an ingress service label lookup and instruct the line cards to forward the packet based on the type of service label determined from the service label lookup.

Conventionally, a service label lookup has been used to return a value indicative of the VRF to which the service label has been assigned. According to an embodiment of the invention, the service label lookup returns in addition a value indicative of the type of service label. By returning a service label type indication, the network element can be instructed to perform particular operations on the packet. The value of the service label lookup continues to return the VRF information as well, however. Thus, a service label table may be considered to include two values for each service label—a service label type attribute and a VRF identification attribute. For example, the a service label lookup on a particular packet may identify the VRF associated with the packet and that the service label type is such that the ingress service card 50 should perform additional operations on the packet. Depending on the service label type, the data plane may be instructed to perform particular operations, such as forward the packet to the control plane 52 for further processing, forward the packet to one or more of the egress service cards 54, or drop the packet.

Service Labels

Service labels are 20 bit identifiers that are assigned by a PE network element to facilitate handling of incoming packets. For example, a service label may enable the network element to accelerate processing of incoming packets to enable the data plane to scale to handle larger numbers of packets in a given time. Service labels thus allow faster processing of the incoming packets by providing information to the network element about the packet associated with the service label. Since they are used by the network element to handle incoming packets, they are advertised along with the routes and are attached by the network elements when packets are forwarded back to the PE network element.

Additionally, the address mechanisms used on the networks interconnected by the provider network, such as the IP addresses of the packets, may not be globally unique. Thus, two VPNs may contain routes that each are associated with identical IP addresses. Service labels allow a PE network element to handle packets associated with different VRFs that have the same IP address without leaking traffic from one VRF to another VRF. Since service labels are assigned on a per VRF basis (service labels do not span VRFs) the service label value serves as an additional way of distinguishing traffic between VPNs.

According to an embodiment of the invention, service labels are associated with service label types when allocated, and a service label type attribute is associated with the service labels such that the service label type may be ascertained from a service label lookup. The service label type attribute of the service label indicates, to the network element, how the packet associated with the service label should be handled or processed. By defining actions that should be taken on a per service label type, rather than requiring the network element to take the same action for all packets, handling of packets on the control plane may be optimized. Additionally, new services may be defined or enabled due to the flexibility in how the network element handles packets.

In the discussion above and in what follows, a service label length of 20 bits will be described, since that is the current standard. Should the standard change or be amended to allow service labels of other sizes, the invention may be practiced using service labels of other sizes without departing from the scope of the invention.

The particular service label type may be determined by the data plane via a service label lookup. The data structure in which the lookup is performed may be created to allow the data plane to determine the service label type as well as the VRF to which the service has been assigned. For example, the data structure may include a service label type attribute for each service label, in addition to an indication of the VRF with which the service label is associated. In this data structure, a successful service label lookup will result in a service label entry, which will include both the service label type attribute and the VRF information for that service label. The invention is not limited in this manner, however, as other data structures may be used as well.

Service Label Types

Through the use of service labels, it is possible to enhance scalability, enhance management of routes, alter how packets are handled on the dataplane, and allow additional services to be provided by the network element. According to an embodiment of the invention, the service labels are provided with a new attribute—service label type—that may be used to communicate to the data plane how the packet associated with the service label is to be handled. Several service label types are described herein; the invention is not limited to these particular service label types as numerous other additional service label types may be created as well to perform additional enhanced services.

Service label types are not the same as service label values. Specifically, the service label type identifies to the data plane the type of service label that is associated with the packet. Depending on the type of service label, the dataplane may be able to take particular actions to handle the packet in an optimized fashion. For example, the service label type may identify to the dataplane the output port card to which the packet should be sent without requiring the input port card to perform an IP lookup or other lookup.

The value of the service label, however, regardless of type identifies to the network element the VRF with which the incoming packet is associated. In many instances, there will be one service label of a particular type allocated for each VRF. In other instances, there will be multiple service labels of a particular type allocated for each VRF. In the following discussion, each service label type maintains this distinction and will continue to have a service label value that is usable by the network element to determine the particular VPN with which the traffic is associated. Several example service label types will be described below. The invention is not limited to an embodiment that uses all or only these particular described service label types.

Service Label Type=Loopback

Network elements are commonly configured with a virtual address, referred to as a loopback address, that is not associated with any one particular physical address. Since the loopback address is a virtual interface, it will not be affected by a line card failure and, hence, may be advertised instead of a physical interface on the network.

Loopback interfaces require additional processing, since the data plane or control plane needs to determine over which interface an incoming packet should be forwarded. Thus, according to an embodiment of the invention, a service label type=loopback may be defined to identify to the dataplane that any incoming packet with that service label type is addressed to the loopback address and thus should be treated accordingly. By defining a loopback service label type, the dataplane knows the packet is addressed to the loopback interface and may perform a service label lookup to determine which VRF the packet is associated with.

Thus, one service label may be allocated per VRF basis for all loop-back addresses configured on a given VRF. Such dedicated service label scheme is used to handle terminating traffic destined to the loop-back address. Traffic arriving with such service label will be redirected to the control plane for further processing. Specifically, as shown in FIG. 3, upon receiving a packet, the ingress data service card 50 will perform a service label lookup, determine that the service label is a loopback type, and redirect the packet to the control card 52 for further processing.

Service Label Type=Per Interface Group

An interface group is a collection of interfaces that physically reside on a given line card. From a data plane optimization standpoint, it may be advantageous to define a service label on a per-line card basis, such that whenever a packet is received at an ingress port the ingress card may determine, based on the value of the service label, the egress line card host the port over which the packet will be forwarded. According to an embodiment of the invention, a service label type per interface group is defined such that when a service label of this type is received, the data plane is able to determine that it may forward the packet to the egress card associated with the service label using a service label lookup without performing an IP lookup.

Thus, by defining a service label type based on interface group, it is possible to distribute the processing between the ingress and egress cards of the network element to accelerate handling of packets on the data plane. Specifically, the ingress card will detect the service label type and determine that the service label has been allocated on a per interface group basis. Using a service label lookup it will determine the egress port card and forward the packet to the egress port card. The egress port card will determine the VRF associated with the packet based on the value of the service label and will index into the VRF using the IP address, or other information associated with the packet, to determine the output port for the line card over which the packet should be transmitted. In this manner the IP lookup may be shifted from the ingress port card to the egress port card so that the ingress port card is not taxed with both the IP lookup and the service label lookup processes. Additionally, the ingress port card is not required to be programmed with IP information, to thereby save valuable network processor time that would otherwise be required to be used to program the ingress port card with the IP information to enable it to perform the IP lookup.

For example, assume that a given VRF has 1000 interfaces (e.g. subscribers that are connecting to the VPN). These 1000 interfaces may be connected to the network element over a small number of port cards, for example over 5 port cards. By assigning service labels on a per port card basis, it is possible to assign 5 service labels to the 1000 interfaces. Additionally, by defining a service label type=per interface group, the data plane knows that the service labels have been assigned on a per port card basis, and may use this knowledge to efficiently handle packets associated with those 1000 interfaces. The invention is not limited to this example as the service type may be used for many different scenarios as well.

Thus, one service label may be allocated per VRF per interface group for locally learned routes (routes from locally attached CE routers) or configured static routes. Such service label scheme is used to handle IP VPN user traffic coupled with a full VRF IP-FPB lookup at the tunnel exit. Upon receipt of a packet, the ingress card 50 will perform a service label lookup, determine that the service label is an interface group type, and forward the packet to the egress card 54 associated with the egress port. The egress card 54 will perform a service label lookup, a full VRF IP FIB lookup, perform ARP if the address is unknown, and perform L2 encapsulation for the packet. The packet will then be forwarded out on the proper port determined from the FIB lookup.

Service Label Type=Discard Route

A service label type may be defined to instruct the data plane to discard any packets that are associated with that service label. This may be advantageous, for example, where a VRF advertises an aggregate route representing a range of smaller routes. It may be that some of the routes advertised this way are not valid due to an inherent inability to be precise in which routes are advertised in the aggregate route advertisement. Accordingly, it may be desirable to assign a service label to particular routes indicating that the traffic on those routes should be dropped by the data plane. According to an embodiment of the invention, a service label type=discard route is defined. When the data plane receives a packet attached to a service label of this type, the data plane knows to drop the packet and does not perform any further lookup, forwarding, or enqueueing operations on the packet. This reduces the amount of overhead expended by the data plane to process packets that will ultimately be dropped by the network element.

A particular VRF may have many routes that are to be discarded. According to one embodiment of the invention, a service label may be created for the VRF for those routes that are to be dropped. By using a service label of the discard route type, the data plane will drop the packets as described above. By using the same service label for all discard routes of a particular VRF, the control plane may manage the several routes using one service label per VRF to thus minimize service label management overhead.

Thus, a service label may be allocated per VRF for all of its discard routes. Such service label scheme is used to handle discard traffic in the ingress direction. Upon receipt of a packet, the ingress card 50 performs a service label lookup and determines that the service label is the discard type. The packet is then dropped 36 without forwarding through the remainder of the data plane to free resources that are not intended to be dropped by the network element.

Service Label=Flow Distribution

Occasionally it is desirable to distribute flow across multiple egress links to different attached Customer Edge (CE) network elements. For example, a given PE network element may be connected via two or more links to a given CE network element or via two or more links to different CE network elements. Frequently, to enhance redundancy within the network element, the two or more links will be split to be connected to two or more interface cards or port cards. Splitting the links to be interfaced via different port cards enhances resiliency of the connection since both links will not be affected by a given port card failure.

Splitting the traffic between port cards presents an additional challenge for the ingress port card 50. Specifically, traffic received at the ingress port card 50 must be split by the ingress port card and forwarded over the internal switch fabric two or more different ways such that part of the ingress traffic is passed to one egress port card 54*a* and the other portion of the traffic is passed to another egress port card 54*b*.

According to an embodiment of the invention, a service label type=flow distribution is assigned to signal to the ingress port card that the packet associated with the service label is to be subject to flow distribution within the network element. This signals to the network element that it must make a flow determination in connection with the forwarding determination to accelerate the flow distribution process.

Assume that a packet is received at an ingress port card 50. Using normal processing, the ingress port card would perform an ingress IP lookup to determine the output port card over which to forward the packet. If route distribution was to be performed, for example in connection with Equal Cost Multi-Path (ECMP) or link level multihoming redundancy, the ingress port card would determine this from the IP lookup and then perform a hashing or other function to select one of the possible egress cards, and then forward the packet to the egress card. By communicating to the ingress card through the use of a particular service label type that the packet is to be subject to route distribution, the ingress port card can perform the hash process or other process without performing an ingress IP lookup to thus accelerate handling of the packet. The determination as to where to send the packet, in this context, may be done using any conventional manner, such as via a hash algorithm by hashing on the source IP and destination IP addresses contained in the packet. Optionally the service label may have a sub-type to indicate which flow direction algorithm should be used to direct the flow of the packets. The invention is not limited to these particular examples, however, or to any particular flow direction algorithm or mechanism.

Thus, a service label may be allocated per VRF to distribute traffic from the core network over multiple egress data service cards. Such distribution is generally enabled for Equal Cost Multi Path (ECMP) routes and aggregate routes. Specifically, according to an embodiment of the invention, each VRF constructs a list of egress cards over which its interfaces span. Traffic arriving from the core network at the ingress card 50 with a service label of the flow distribution type will trigger a hashing algorithm based on the incoming packet's IP source/destination address, protocol type, and redirect it to one of the egress cards 54*a*, 54*b* in the egress card list for further processing. Although a hashing process has been described, the invention is not limited in this manner as other selection processes may be used as well.

Service Label=Per VRF

A service label per VRF basis may be allocated to enable ingress VRF IP FIB lookup for traffic arriving from the core network. Service per VRF is one of the service label types described in IETF RFC 2547, and thus will not be described in great detail herein. Additional information about this service label type may be found in IETF RFC 2547, the content of which is hereby incorporated herein by reference. Traffic arriving will be subject to a service label lookup which will determine that the packet has a service label of the per-VRF type. This service label allocation scheme may be particularly useful for aggregate VRFs for management VRFs, although the invention is not limited in this manner.

Service Label=Per Next Hop

In particular circumstances, it is efficient to allocate service labels on a per next hop basis such that each route that passes through the next hop is assigned the same service label. This is particularly the case where there are a small number of available next hops and it is thus efficient, from a control plane standpoint, to manage a small number of service labels. This also may be advantageous from the data plane standpoint, as the data plane may determine the next hop attribute associated with incoming packets simply from doing a service label lookup and without performing a full IP lookup. This type of service label indicates to the data plane that the service label is a next hop type, and that the data plane may obtain the next hop information for the packet from the service label lookup. The value of the service label indicates the VRF as well as the next hop attribute for the packet. Service label per next hop is one of the service label types described in IETF RFC 2547, and thus will not be described in great detail herein. Additional information about this service label type may be found in IETF RFC 2547, the content of which is hereby incorporated herein by reference.

One limitation to this type of service label is that it specifies the next hop explicitly, and thus does not lend itself to use with flow distribution. Especially with ECMP routes, which often require packets for the same route to pass through different next hops, this next hop service type is not applicable. However, for those routes that are not subject to flow distribution, this service type may advantageously accelerate handling of packets at the dataplane without incurring excessive service label management overhead at the control plane.

Thus, a service label per VRF per next-hop basis may be allocated to enable packets to be forwarded on a per next-hop basis. Such service labels are allocated for locally learned routes (routes from locally attached CE routers) or configured static routes. Traffic arriving from the core network on an ingress card will be subject to a service label lookup and will be subject to service label based forwarding. Since IP FIB lookups are viewed as potentially compromising security, and allocating service labels on a per next-hop basis is generally used to avoid this potential security problem, traffic associated with a per next-hop basis service label is forwarded without an IP FIB lookup. This also helps accelerate processing of the packet on the data plane.

Service Label Type=Attached Subnet

Depending on the network topology, a service label per next hop may not be appropriate, for example where the packet is addressed to a network element that is directly attached to the PE network element or to a subnet that is connected to the PE network element. Packets of this type may require the network element to perform additional processing, which require the packets to be directed to the control plane. Additionally, the next hop in this instance may be to one of a large number of directly connected receivers. Since one benefit of using service labels is to allow the data plane to scale to handle more routes and traffic, using a separate service label for each network element that is associated with an attached subnet does not lead to enhanced efficiency. Accordingly, a service label type=attached subnet may be created for each VRF to identify to the data plane those packets that are associated with an attached subnet. Where all the attached subnets are connected to the PE network element through a particular interface card, traffic arriving with this service label type may be routed directly to that card for processing. The egress card may then do local determination subprocessing, network address translation, and other functions commonly performed with forwarding traffic onto a local attached subnet.

Thus, a service label per VRF per attached subnet basis may be allocated to enable optimized IP VPN datapath at the tunnel exit. Such service labels are allocated to handle subnet specific behaviors such as broadcast traffic, and traffic terminating on locally attached interfaces. In this service type, data arriving at an ingress card is subject to a service label lookup at the ingress card 50 and routed internally to the egress card 54 where it is processed as locally terminating traffic.

Service Label Type=ECMP

Many customers want to allocate service labels on a per next-hop basis, because of the advantages gained in the data plane as well as the enhanced security associated with this type of service label allocation. Specifically, from a security standpoint, a customer may not want any IF lookup at the tunnel exit to prevent unauthorized traffic from being able to be visible to another site. For example, in a hub-and-spoke topology, the hub may require all spoke traffic to only pass through the hub, and not allow any inter-spoke direct communication. In this instance, requiring service labels to be allocated on a per next-hop basis, denoting the next hop as the CE hub, prevents traffic from being routed via IP address from one spoke to another.

Unfortunately, service label management on a per next-hop basis prevents routes, such as Equal Cost Multi Path (ECMP) routes from being used. In this context, an ECMP route is a generic term for two or more routes that have the same start and end points and approximately equivalent cost, and thus may be used interchangeably to carry traffic. The nice aspect of ECMP routes is that they may be used to provide redundant paths through the network and, by balancing traffic on the several routes, less congestion can be expected between the end-points.

When service labels are allocated on a per next-hop basis, however, the path is strictly set by the next hop identified by the service label. Thus, traffic for a route will always be advertised with the same service label and, hence, will always take the same next hop. Thus, traffic balancing across ECMP routes is not possible in a per next-hop service label management system.

According to an embodiment of the invention, a service label management system enables service labels to be allocated on a per ECMP route basis. In this embodiment, the service label instead of pointing to a single next hop, points to a set of next hops that may be used to forward the packet.

When a packet arrives at the data plane, the ingress network processor will perform a service label lookup, determine the service label is of the ECMP type, and determine which routes are associated with the VPN. The data plane then performs a hash operation on aspects of the IP header or other selection operation to route packets from a flow consistently over one of the routes associated with the ECMP route. In this manner, the service label per ECMP route enables packets to be forwarded on over the routes forming the ECMP route. Additionally, because an IP lookup was not performed, the security rules associated with maintaining strict security over routes may be maintained.

The service label per ECMP route type is similar to the service label flow distribution type discussed above although with several distinctions. ECMP routes represent two paths from a given network element to another network element. Thus, packets associated with a service label per ECMP route type will arrive at the same network element although they may traverse different paths through the network. Packets associated with a flow distribution type service label, however, may take two or more paths through the network to reach two or more different endpoints. This allows traffic on a VPN to be balanced between two or more VPN gateways on a customer's site, for example. Thus, although the two types are related, they allow different functions to be performed and different services to be offered by the network element. Additionally, service labels per ECMP route may be allocated on a per route basis, whereas service labels per flow distribution are allocated on a per VRF basis. Thus, one service label for flow distribution may be used to split traffic for the VRF into two or more subsets, whereas service labels per ECMP route are used to split traffic on a particular route between multiple paths through the network.

Service Label=Aggregate Route

Aggregate routes are used to advertise route information about a set of contributor routes, which is generally a subset of the router's forwarding information base. By designating a service label as associated with an aggregate route, it is possible to identify routes associated with that aggregate route as being directed to the subset of the router's forwarding information base. Accordingly, when a packet arrives, it is not necessary to perform an IP lookup on the full forwarding information base, but rather the IP lookup may be performed on the restricted portion or subset of the VRF's forwarding information base. This may accelerate IP lookups for those routes that are associated with the aggregate routes. Aggregate route service labels are thus allocated on a per-route basis. When a packet with a service label per aggregate route is received, the network element will perform an IP lookup to determine if the packet can be forwarded. This IP lookup may be performed at the ingress or egress card. For example, if the lookup is performed at the ingress card, the network element may perform load balancing on the aggregate route. If it is performed at the egress card, the number of IP lookups on the ingress card may be minimized. The invention is not limited to where the IP lookup is performed and, as discussed below, the type of IP lookup will be based on the tunnel exit mode of the network element.

Although several service label types have been described herein, the invention is not limited in this manner as other service label types may be used as well.

Tunnel Exit Mode

The network element data plane may be optimized by controlling if and where an IP lookup will occur and minimize the scope of the IP lookup if possible to reduce the burden associated with the IP lookup whenever possible. Generally, I/O cards facing the core network will carry more traffic as the links interfaced to the network element over the core tend to be of a higher bandwidth and handle a larger numbers of packets, whereas the access cards (egress data service cards 54) tend to interface lower bandwidth links and tend to handle less of the traffic on a per card basis. Thus, minimizing the number of IP lookup operations on the core cards is generally considered preferable. Several tunnel exit modes will be discussed that differ based on how an LP lookup is configured to be handled for the particular tunnel. The particular tunnel exit mode associated with a service label may be selected on a per service label basis, per VRF basis, or in another manner. Tunnel exit, in this instance, refers to the fact that the tunnel on the network is terminating at the PE network element. The IP mode of the tunnel exit refers to where, in the PE network element, an IP lookup is performed on packets associated with that tunnel.

Tunnel Exit Mode: Ingress IP

If an ingress card (core card) is to perform an IP lookup for packets received over a VPN tunnel, the tunnel exit mode is set to ingress IP. In this mode, when a VRF is configured, its forwarding information base (FIB) is installed on the data service cards over which its interfaces span. When the tunnel exit mode of a given VRF instance is set to ingress IP, its FIB is also installed on every core facing data service card. This extended FIB download scheme allows IP VPN traffic from the core (the tunnel end point) to be handled and forwarded by the ingress network routing engine data service cards. This tunnel exit mode may be used in a number of different circumstances, but is optimally deployed where the VRF holds a low number of routes and a low number of exportable routes, as an IP lookup in that instance is relatively quick. Where larger numbers of routes are contained in the VRF the IP lookup may become difficult to implement at the ingress due to the increased amount of processing required to perform a full IP lookup in the larger tables. Additionally, where the VRF interfaces span many interface card groups, setting the tunnel exit mode to ingress IP may be advantageous.

Depending on the tunnel exit mode, different labels may be generated. For example, a VRF with the tunnel exit mode set to ingress-IP would be able to generate service labels of the loopback type, discard type, and per VRF type. The other label types discussed above do not require an ingress IP lookup, and thus typically wouldn't be available in this tunnel exit mode.

Tunnel Exit Mode: Egress IP

When a VRF is configured, its FIB is installed on the data service cards over which its interfaces span. When the tunnel exit mode of a given VRF instance is set to egress-IP, its tandem IP VPN traffic from the core is handled and forwarded by the egress data service cards. Essentially, in this tunnel exit mode, the ingress data service cards are configured to forward traffic to one or more egress data service cards, which perform an IP lookup to determine how the traffic should be handled. Because the egress data service cards are generally less trafficked, they may be better equipped to perform IP lookups on the traffic on the VPN. This tunnel exit mode may be used, for example, to perform flow distribution or ECMP based flow balancing for VPNs where an IP lookup is acceptable. The types of service labels that may be used in connection with this tunnel exit mode include service labels allocated for loopback, per interface group, discard route, and for flow distribution.

Tunnel Exit Mode: Automatic

The network element hosting a VPN may be configured to determine the tunnel exit mode automatically depending on the service to be provided and the type of label to be used. In this mode, traffic received from the core is handled and forwarded by the ingress data service cards via service label lookup without an IP lookup and forwarded within the network element based on the service label lookup. Depending on the type of service label, an egress IP lookup may optionally be performed. Additionally, depending on the particular type of traffic being handled, the network element can thus configure the location of the IP lookup, if any, so that any of the above service labels may be used.

Service Label Management

Although service labels and several service label types have been described herein, service label management is also very important to allow the network element to optimally handle service labels and to enable the network element to benefit from the use of these service labels.

Figure 5:
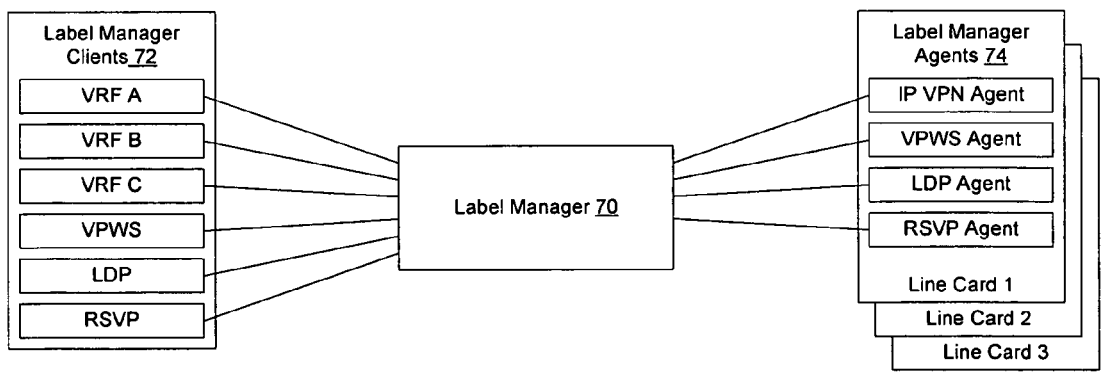
FIG. 5 is a functional block diagram of a software architecture for a service label management system according to an embodiment of the invention.

FIG. 5 illustrates a hierarchical view of a label management system according to an embodiment of the invention. As shown in the embodiment of FIG. 5, a label manager 70 interacts with label manager clients 72 to allocate labels to those clients. The service labels generated by the label manager are provided to the clients and are also passed to label manager agents 74 on the line cards to enable the line cards to use the labels to forward traffic in the data plane.

The label manager clients 72 are entities that need service labels. Examples of several typical clients include Virtual Routing and Forwarding (VRF) entities, Virtual Private Wire Service (VPWS) entities, Label Distribution Protocol (LDP) entities, and Reservation Protocol (RSVP) entities. Other clients may require labels as well, and the invention is not limited to an embodiment that includes these particular clients or is configured to interact only with these particular illustrated clients.

Upon receipt of a request for a service label, the label manager 70 allocates the label and returns the label to the client 72. The label manager 70 also passes the label to the label manager agents 74 on the line cards. The line cards, in this example, are input/output I/O cards forming part of the data plane, or are cards such as data service cards configured to manage I/O cards in the data plane. The agents on the line cards use the service labels to provide services on the network. Examples of several agents that may be instantiated on the line cards include an IP VPN agent, a VPWS agent, an LDP agent, and an RSVP agent. Other agents may be used as well and the invention is not limited to this particular selection of agents. Typically, it would be expected that there would be one label manager agent for each label manager client type, although the invention is not limited in this regard.

Figure 6:
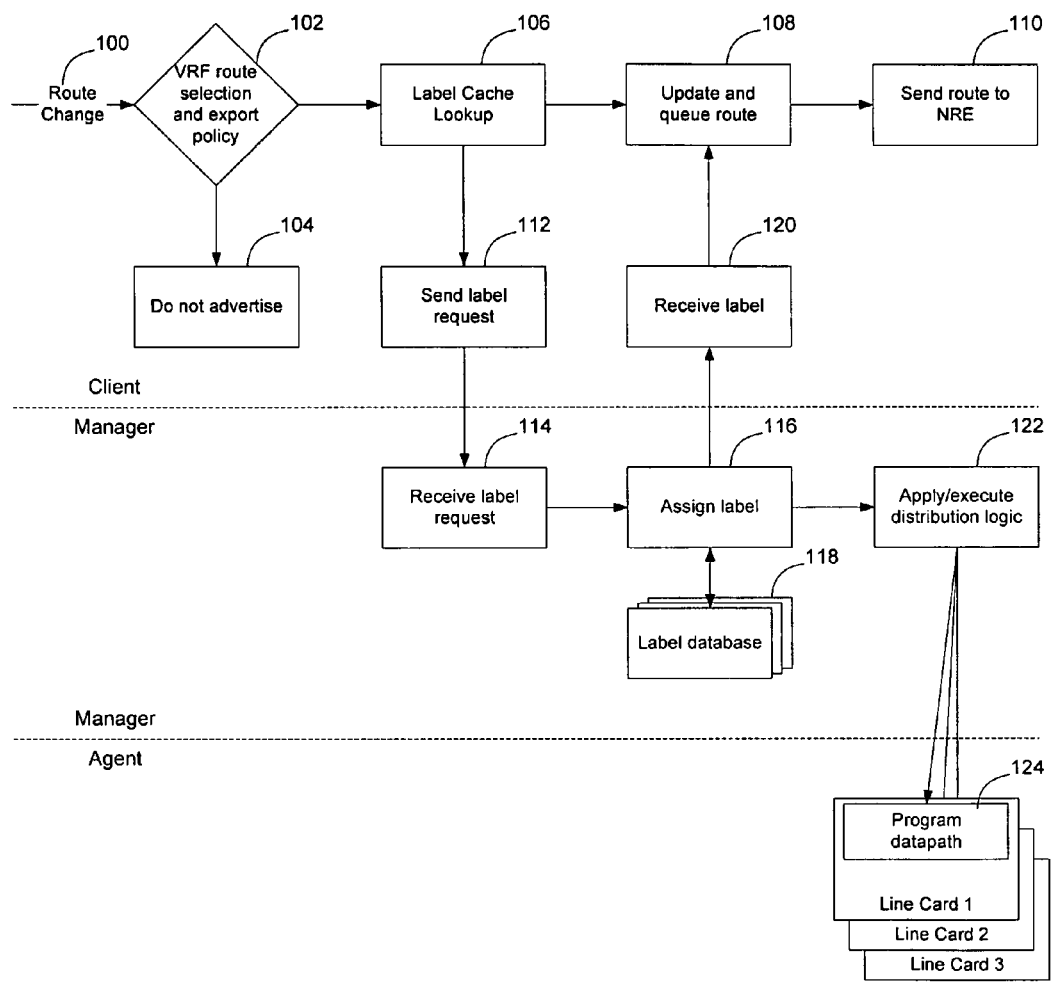
FIG. 6 is a flow chart illustrating a process of assigning labels using the software architecture of FIG. 5 according to an embodiment of the invention.

FIG. 6 illustrates a process of allocating labels using the label manager system of FIG. 5. In the example illustrated in FIG. 6, the process is described in connection with a route change in an IP VPN context. The same process could be used to generate labels for other clients as well and the invention is not limited to this particular example.

As shown in FIG. 6, when a route change occurs, or another process occurs that requires a label change on a new label (100), the route change is passed to the VRF which makes a determination (102), based on the VRF route selection and export policy, whether to block the route or advertise the route. If the route is blocked, it will not be advertised (104) and, hence, does not need a label.

If the route is to be advertised, it is necessary to associate a label with the route. Accordingly, the client will perform a label cache lookup (106) to determine if the label is in its cache. If the label is found, it will update the route with the label and queue the route (108) to be sent to the network routing engine (110). The route with the service label will then be advertised on the network.

If the service label is not found in the label cache lookup (106), the client will send a label request to the label manager (112). The label client knows the type of route to be advertised and, hence, the label request will include the label type, the application type, and any correlation data (such as VPN ID) required by the label manager to issue a label.

The label manager will receive the label request (114) and assign a label (116) by querying the label database to ascertain if the request is the same as a previous request, and hence should be allocated the same label, or is a new request and thus requires allocation of a new label (118). If the label request matches a previous request, the request will be assigned the same label as the previous request. This may happen, for example, where the client cache does not contain all the labels assigned to the client or where label information ahs been lost in the control plane, e.g. due to a control plane failure. If the label request does not match a previous label request, a new label will be generated and allocated to the request.

The assigned label will then be stored in the label database to prevent it from being reissued in response to another request. The label is also provided to the client that issued the request (120) so that the label may be stored in its label cache and used to update the route (108). The updated route with newly assigned label will then be sent to the network routing engine (110) to be advertised on the network.

Figure 7:
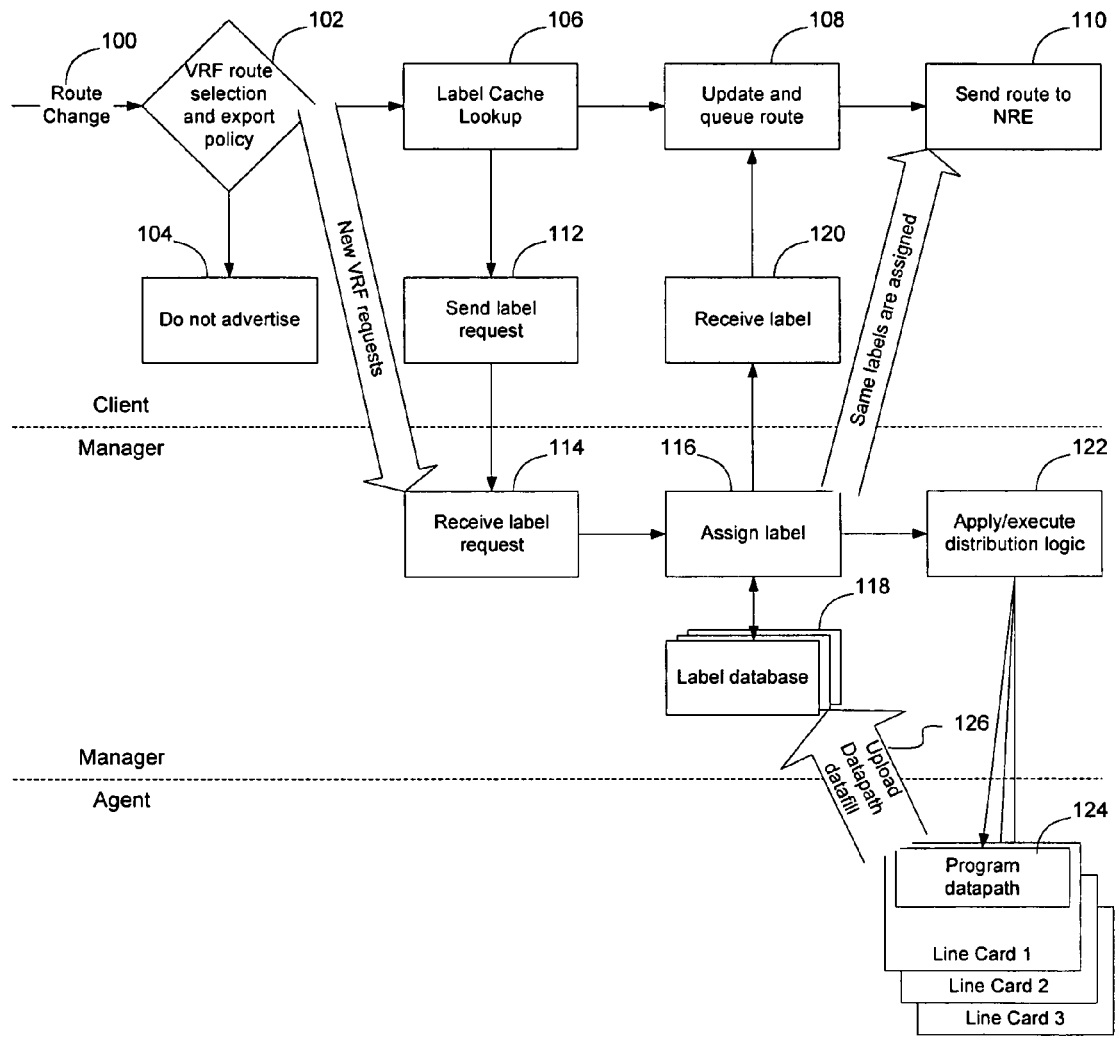
FIG. 7 is a flow chart illustrating a process of recovering from a control plane fault according to an embodiment of the invention.

The new label and route information needs to also be passed to the agent to enable the line cards to be programmed with the new information. Accordingly, the manager applies distribution logic (122) to determine which agents are required to receive the new information and provides the label to the line card agents. As discussed in greater detail below in connection with FIG. 7, the original label request is also passed to the agent along with the newly assigned label, to enable the label database to be reconstructed in the event of a control plane failure. The agents use the labels to program the datapath (124) and store the label request on the data service cards in the dataplane.

When a label is no longer required, the label may be released by the client and reused by the label manager. However, routes on the network may still have a route in their forwarding information bases that is associated with the newly released label. According to an embodiment of the invention, the label manager will not re-allocate a recently released label for a period of time to avoid using service labels that may still be in use on the network, which might cause the traffic to be mishandled by the network element.

FIG. 6 illustrates a process of recovering from a control plane fault. Specifically, assume that the control card hosting the label manager and clients experiences a failure, and the label database is erased and the client label caches are erased. To recover from the failure, the control card will need to generate new labels to fill the label database and repopulate the client label caches. However, the labels are already in use on the network and are still being used by the dataplane to forward traffic and, therefore, generation of new labels for all the routes is not desirable. According to an embodiment of the invention, upon detection of a failure by the line cards, the line cards will start to upload label information and original request information to the label database. As mentioned above, when labels are passed to the line cards, the original request that generated the label is also passed to the line cards. Since the label manager assigns labels on a request basis, if the original request information that generated the label is restored to the database, the label manager will be able to assign that same label to the client in response to its request. Note that the client will generate a new request identical to the previous request if the circumstances associated with the request have not changed. If the circumstances have changed and the request is different, a new label would have been generated regardless of the loss of data in the control plane. This allows the line cards to serve as a backup to the control plane to thereby allow the line cards to help in the recovery process from a control plane failure.

The label database may thereby be repopulated from information received by the line cards. The clients on the control plane will also have experienced the failure and, accordingly, will start generating requests for new labels. For example, the VRF will start receiving route information from the network and will relearn all its routes. As it learns its routes it will generate label requests for those routes just as it did prior to the failure. Since its cache has been erased, these requests will be passed to the label manager. Since the label information and request information has been repopulated to the label database, upon receipt of a label request, the label manager will be able to match the new request with the original request and assign the same labels to those routes. Accordingly, the control plane may recover from a control plane failure without requiring new labels to be assigned to routes on the network. This minimizes the number of routes that need to be changed on the network in connection with a control plane failure.

The control logic may be implemented as a set of program instructions that are stored in a computer readable memory within the network element and executed on a microprocessor, such as a network processor. However, in this embodiment as with the previous embodiments, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that all functional statements made herein describing the functions to be performed by the methods of the invention may be performed by software programs implemented utilizing subroutines and other programming techniques known to those of ordinary skill in the art.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for allocating service labels, the method comprising the steps of:
    receiving, by a service label management system from a virtual routing and forwarding process, a first request for the service label management system to allocate a service label to the virtual routing and forwarding process, said first request containing request information that comprises an identification of the virtual routing and forwarding process and an attribute indicating a type of service label requested;
    searching by the service label management system, based on the request information, a database of previous requests from virtual routing and forwarding processes for allocation of service labels, to ascertain if the request information of the first request matches request information of a previous request for service label allocation;
    if the first request matches a previous request, assigning to the first request, a service label previously assigned to the previous request and passing the service label previously assigned to the previous request to the virtual routing and forwarding process;
    if the first request does not match a previous request, assigning to the first request a service label not currently in use on the network and passing the assigned service label to the virtual routing and forwarding process; and
    upon occurrence of a loss of data by a control plane, receiving, by the control plane from a data plane, request information associated with the requests for service label allocation and the service labels that were allocated by the service label management system in response to the request and stored in the data plane, to enable the control plane to recreate the database of previous service label requests and allocated service labels after the occurrence of the loss of data by the control plane;
    wherein the service label is an inner label to be used in an Multi-Protocol Label Switching (MPLS) based Virtual Private Network (VPN), the MPLS-based VPN using the inner label to identify traffic received from a Label Switched Path and using an outer transport label to switch traffic along the Label Switched Path.

2. The method of claim 1, wherein the step of searching comprises the step of comparing the request information associated with the first request with request information associated with the previous requests.

3. The method of claim 1, further comprising the step of:
    if the first request does not match a previous request, assigning to the first request a new service label according to the request information.

4. The method of claim 1, further comprising the step of:
    distributing the assigned service label and request information to a data plane, said service label being configured to be attached as the inner label by said data plane to packets associated with the MPLS-VPN.

5. The method of claim 1, wherein the database is a service label cache.

6. The method of claim 5, wherein the step of generating a request for a service label is performed in connection with a route to be advertised by the virtual routing and forwarding process, the method further comprising the step of advertising the route with the service label after the service label has been allocated by the service label management system.

7. A method for enhancing resiliency of service label information in a network element, the network element having a control plane and a data plane, the method comprising the steps of:
    allocating, by a service label management system, service labels in response to requests for service label allocation from service label clients, each service label request containing request information that comprises an identification of the service label client and an attribute indicating the type of service label requested by the service label client, the service labels being inner labels for use in Multi-Protocol Label Switching (MPLS) based Virtual Private Networks (VPNs), the inner label being used at a destination network element to differentiate traffic received on a Label Switched Path from the MPLS network and not being used as a transport label on the Label Switched Path;
    passing the service labels to the data plane to be used by the data plane in connection with forwarding traffic onto the MPLS based VPN;
    communicating the request information contained in the request and the service label that was allocated by the service label management system in response to the request, from the control plane to the data plane;
    storing the request information and the service label that was allocated by the service label management system in response to the request in the data plane; and
    upon occurrence of a loss of data by the control plane, receiving, by the control plane from the data plane, the request information associated with the requests for service label allocation and the service labels that were allocated by the service label management system in response to the request and stored in the data plane, to enable the control plane to recreate a database of previous service label requests and allocated service labels after the occurrence of the loss of data by the control plane;
    wherein allocating service labels after the occurrence of the loss of data by the control plane comprises the steps of:
    searching by the service label management system, based on the request information, the database of previous service label requests and allocated service labels, to ascertain if the request information of the first request matches request information of a previous request for service label allocation;
    if the first request matches a previous request, assigning to the first request, a service label previously assigned to the previous request and passing the service label previously assigned to the data plane; and if the first request does not match a previous request, assigning to the first request a service label not currently in use on the network and passing the assigned service label to the data plane.

8. The method of claim 7, wherein the step of communicating information to the data plane comprises distributing label information to the data plane to program the data plane to forward traffic according to the service label, and wherein the information associated with the request for service label allocation that is communicated to the data plane is not usable by the data plane to forward information without the service label.

9. The method of claim 7, wherein the loss of data by the control plane occurs in connection with a failure of the control plane.

10. The method of claim 7, wherein the service label has a service label type attribute, said service label type attribute specifying to the data plane actions to be taken on packets associated with the service label.

11. The method of claim 10, wherein the actions to be taken on the packets are different for different service label types.

12. A method of providing resiliency to service label management in a network element, the method comprising the steps of:
   receiving at a data plane of the network element, service labels for use in programming the data plane to handle traffic on the network element and service label request information associated with the service labels, the service label request information including, for each service label, an identification of a service label client that requested allocation of the service label, and an attribute indicating a type of service label requested by the service label client; and
   upon request by a control plane of the network element, providing the service label request information by the data plane to restore the service label request information to a database for use by the control plane to enable the control plane to re-allocate the same service label after failure of the control plane as had been previously allocated by the control plane prior to failure of the control plane;
   wherein the service label is an inner label to be used in an Multi-Protocol Label Switching (MPLS) based Virtual Private Network (VPN), the MPLS-based VPN using the inner label to identify traffic received from a Label Switched Path and using an outer transport label to switch traffic along the Label Switched Path;
   wherein re-allocating service labels after the occurrence of the loss of data by the control plane comprises the steps of:
   searching by the service label management system, based on the request information, the database of previous service label requests and allocated service labels, to ascertain if the request information of the first request matches request information of a previous request for service label allocation;
   if the first request matches a previous request, assigning to the first request, a service label previously assigned to the previous request and passing the service label previously assigned to the data plane; and
   if the first request does not match a previous request, assigning to the first request a service label not currently in use on the network and passing the assigned service label to the data plane.

13. The method of claim 12, wherein the service label request information is not used by the data plane to program the data plane to handle traffic on the network element.

14. The method of claim 12, wherein the service labels may be one of a plurality of types, each type specifying a set of actions to be taken by the data plane for traffic associated with that service label type.

* * * * *